United States Patent [19]
Sheehy

[11] Patent Number: 5,083,610
[45] Date of Patent: * Jan. 28, 1992

[54] RECOVERY OF OIL FROM OIL RESERVOIRS

[75] Inventor: Alan Sheehy, Giralang, Australia

[73] Assignee: B. W. N. Live-Oil Pty. Ltd., Dandenong, Australia

[ * ] Notice: The portion of the term of this patent subsequent to Nov. 20, 2007 has been disclaimed.

[21] Appl. No.: 514,121

[22] Filed: Apr. 25, 1990

Related U.S. Application Data

[63] Continuation of Ser. No. 321,478, Mar. 9, 1989, Pat. No. 4,971,151.

[30] Foreign Application Priority Data

Apr. 19, 1988 [AU] Australia ............... PI7817/88

[51] Int. Cl.$^5$ ............................................. E21B 43/22
[52] U.S. Cl. .................................... 166/246; 166/273; 210/610; 435/281
[58] Field of Search ........ 166/246, 267, 271, 273-275, 166/307, 308; 210/610, 611, 747; 435/281

[56] References Cited

U.S. PATENT DOCUMENTS

| | | | |
|---|---|---|---|
| 2,807,570 | 9/1957 | Updegraff | 166/246 |
| 3,105,014 | 9/1963 | Harrison | 166/246 |
| 4,450,908 | 5/1984 | Hitzman | 166/246 |
| 4,475,590 | 10/1984 | Brown | 166/246 |
| 4,558,739 | 12/1985 | McInerney et al. | 166/246 |
| 4,640,767 | 2/1987 | Zajic et al. | 166/246 |
| 4,799,545 | 1/1989 | Silver | 166/246 |
| 4,905,761 | 3/1990 | Bryant | 166/246 |

Primary Examiner—Thomas Wyse
Attorney, Agent, or Firm—Ladas & Parry

[57] ABSTRACT

This invention relates to a process for recovery of oil from oil reservoirs with assistance from microorganisms. More particularly, the present invention contemplates a method for recovering oil from a reservoir comprising increasing the population of endogenous microorganisms in said reservoir, said microorganisms having surface active properties, to a level sufficient to effect enhanced oil recovery.

32 Claims, 2 Drawing Sheets

FIG. 2

RECOVERY OF OIL FROM OIL RESERVOIRS

This is a continuation of co-pending application Ser. No. 07/321,478 filed Mar. 9, 1989, now U.S. Pat. No. 4,971,151.

This invention relates to a process for recovery of oil from oil reservoirs with assistance from microorganisms.

During primary oil production, the pressure within a reservoir decreases with a subsequent decline in oil production. To compensate for this production decrease water or gas is injected into the reservoir. This process is referred to as secondary oil production. During secondary production, the water to oil ratio increases until oil production is no longer economical. The residual oil, up to 65% of the original oil in place (OOIP), is distributed in a significantly different pattern to the OOIP. The failure of secondary oil production procedures to release trapped residual oil results from capillary forces in the oil/water/rock system and the failure of injected fluids to penetrate parts of the reservoir formation. Surfactants are used to lower the interfacial tension between reservoir fluids and residual oil so that oil which cannot be removed by the injected fluids alone is displaced. Surfactants used in chemical EOR (enhanced oil recovery) show optimal activity over a narrow range of temperature, HLB (hydrophobic lipophilic balance) values, salinities and rock types. Thus, surfactant EOR processes are generally developed for individual reservoirs.

Surfactants derived from crude oil (e.g. petroleum sulphonates) have been shown in some field pilots to strip out residual oil but at a cost much higher than the market value of the oil recovered in this way. The surfactants are themselves expensive: they tend to adsorb to rock, and so large quantities are needed. Polymers, too, have had some successes, but again at a high cost. Both polyacrylamide, made from petroleum feedstocks, and the microbial product xanthan gum have been used: the former is less expensive but is not effective at the high temperatures and salinity levels common in many reservoirs. The latter is technically more satisfactory though there are problems of microgel formation causing blocking at the injection face, degradation may take place in the reservoir and, once again, the material is expensive.

It has been proposed to use microorganism derived surfactants for EOR. This technique is known as microbially enhanced oil recovery (MEOR).

The production of surface active agents by microorganisms has been recognised for a number of years. These biosurfactant compounds almost universally contain a lipid component and are usually glycolipids. Other classes of biosurfactants are lipopeptides, phospholipids, fatty acids and neutral lipids.

There are several potential advantages in using MEOR processes. These include, the wide range of compounds with useful properties for EOR that can be produced by microbial biosynthesis, cost, and the ability to produce biometabolites within the reservoir and thus decrease the amount of chemical surfactants required.

Current MEOR techniques have involved the injection and establishment of an exogenous microbial population in an oil reservoir. This population is supplied with nutrients such as molasses or other fermentable sugars, a source of nitrogen and mineral salts as additives to the water flood employed for secondary oil removal. Other hydrocarbon substrates have been researched, however the economic advantage of fermentable sugars have made them the preferred substrate.

The development of methods utilizing the injection of microorganisms into oil reservoirs has been limited by the conditions which prevail in oil reservoirs. In particular, small and variable reservoir pore sizes together with extremely high temperatures, salinity/ionic strengths and pressures have severely limited the type, range and number of micoorganism that can be injected. Further, and of equal significance, is the highly reduced environment present in many reservoirs. The absence of oxygen severely limits the range of biometabolites that can be synthesized by organisms introduced into oil reservoirs.

A disadvantage of the microorganisms utilized in current MEOR technology is that they may tend to occlude the reservoir pores due to their large cell volume caused by the rich nutrient conditions provided in the waterflood. These large cells may also find it difficult to penetrate small pores in the rock.

We have surprisingly found that the surface active properties of those microorganisms which are adapted to grow in oil well conditions, may be enhanced by subjecting the microorganisms to nutrient limiting conditions. Such microorganisms are especially useful in MEOR.

Accordingly, the present invention contemplates a method for recovering oil from a reservoir comprising increasing the population of endogenous microorganisms in said reservoir, said microorganisms having surface active properties, to a level sufficient to effect enhanced oil recovery. Enhanced oil recovery is effected, in one aspect of the present invention, under pressure by reducing interfacial tension of oil in said reservoir.

More particularly, one aspect of the present invention contemplates a method for recovering oil from a reservoir comprising the steps of:

(a) isolating endogenous microorganisms from said reservoir;

(b) ascertaining the limiting nutrient(s) for growth of said microorganisms;

(c) supplying an effective amount of said nutrients(s) to said reservoir for a time and under conditions sufficient to effect an increase in population of endogenous microorganisms;

(d) maintaining said reservoir for a time and under nutrient limiting conditions sufficient to enhance surface active properties of said microorganisms; and (e) subjecting said reservoir to oil recovery means.

Another aspect of the present invention contemplates a method for recovering oil from a reservoir comprising the steps of:

(a) isolating endogenous microorganisms from said reservoir;

(b) ascertaining the limiting nutrients(s) for growth of said microorganisms;

(c) growing said microorganisms under conditions sufficient to increase their population level;

(d) supplying an effective amount of said nutrient(s) together with said microorganisms to reservoir for a time and under conditions sufficient to effect an increase in population of endogenous microorganisms in said reservoir;

(e) maintaining said reservoir for a time and under conditions sufficient to enhance surface active properties of the microorganisms in said reservoir;

(f) subjecting said reservoir to oil recovery means.

According to a further aspect of the present invention, there is provided a method of enhancing the surface active properties of microorganisms, which comprises subjecting microorganisms adapted to grow in oil well conditions to one or more cycles of growth in a nutrient medium followed by nutrient limitation.

In yet a further aspect of the present invention, there is provided a method of enhanced oil recovery from an oil reservoir which comprises:

(a) providing microorganisms from the reservoir or other source which may be adapted to oil reservoir conditions;

(b) placing the microorganisms in a nutrient medium to promote growth thereof;

(c) subjecting the microorganisms to one or more cycles of nutrient limitation;

(d) introducing the microorganisms to the reservoir;

(e) recovering oil from the reservoir.

The invention may particularly be practised by removing a sample of microorganisms together with a sample of the liquid within the reservoir in which the microorganisms are resident, and analysing the liquid to predetermine likely growth limiting nutrients. "Nutrients" is used in its broadest sense and includes inorganic or organic compounds reguired by a microorganism for growth or which facilitates growth. Inorganic compounds contemplated herein includes those containing at least one of the following elements: C, H, O, P, N, S, Mg, Fe, or Ca. By way of exemplification only, such inorganic compounds include $PO_4^{2-}$, $NH_4^+$, $NO_2^-$, $NO_3^-$, and $SO_4^{2-}$ amongst others. Once determined, the nutrient(s) found to be limiting are then added to the reservoir for a time and under conditions to permit growth of endogenous microorganisms.

At the time of sampling, the amount of assimilative organic carbon is also determined. More particularly, the reservoir is sampled to determine if, once a limiting nutrient is supplied, the endogenous microorganism could grow and obtain carbon and energy from endogenous organic compounds. Standard techniques in the art, such as, spectrophotometry, N.M.R. infra red, HPLC, gas chromatography, chemical tests, and the like, are used to determine the available carbon containing compounds. If required, a carbon source is supplied along with the limiting nutrient. In a preferred embodiment, a non-glucose carbon compound is used since the glucose and compounds comprising glucose units (e.g. molasses), have been found not to enhance the surface active properties of the endogenous microorganism following their growth on such compounds. An example of a preferred non-glucose carbon source is peptone and the like.

Further, an assessment may be made as to the numbers of microorganisms present. If a large number of microorganisms is present, it is possible then to simply add the missing nutrients directly to the reservoir to stimulate growth for a period of time. On the other hand, where there are only a small number of microorganisms present, the microorganisms may be grown such as in the laboratory or, where appropriate, on site, in an appropriate medium in which the missing nutrients are provided, in order to increase the numbers thereof. It is particularly preferred if the microorganisms are subjected to more than one cycle in which nutrients are added to effect growth, followed by subjecting the microorganisms to conditions in which they are again nutrient deficient. After this procedure, the microorganisms are introduced to the reservoir. During each aforementioned cycle of growth promotion and growth inhibition, analysis may be performed to determine whether the microorganisms are in a state of growth. Analysis of fatty acid configuration by HPLC or GLC is particularly convenient as the degree of saturation and cis/trans configuration of membrane lipids appears to alter as growth is retarded in response to nutrient limitation.

Prior methods of enhanced oil recovery using microorganisms are derived from the assumption that certain strains of microorganisms are inherently more suited to the production of surfactants than others and that what is required is to isolate from among all of the known microorganisms those best able to produce surfactants. On the other hand, the present invention is based on the realisation that surfactant properties are an inherent or induceable characteristics of microorganisms within oil reservoirs, and that surface active properties are dependent upon the physical condition of the microorganisms themselves. Therefore, by surface active property is meant the property of a microorganism which reduces surface tension and said property may be endogenous or exogenous to the cell and may include the production of a surfactant. Microorganisms may not only possess surface properties, but may also cause gas production which may facilitate oil recovery. Furthermore, with the prior methods, the introduced microorganisms may not be well suited to survival in the particular environment of the reservoir in question, which environment differs very considerably in terms of for example, temperature, pressure, acidity or the like. Thus, the prospects for successful propagation of the microorganisms through the reservoir are not good. In a preferred aspect of the present invention, where use is made of microorganisms already existing in the reservoir, it is known from the beginning that these are capable of surviving in the environment of the reservoir so that, when returned, they can be expected to survive and to do so without serious risk of adverse environmental sequences attendant upon the introduction of exogenous microorganisms.

Generally too, it will be the case that microorganisms within an oil reservoir are in a nutrient deprived state, since conditions in oil reservoirs are generally not conductive to the thriving of a microorganism population. The microorganisms occupy the boundary between oil and water phases within the reservoir and will be physically located around that boundary in accordance with whether they are nutrient starved or not. As nutrient deprivation sets in, we have found that the microorganisms become more hydrophobic. This effect is associated in a fashion not fully understood with the surfactant-like properties of the microorganisms. On the one hand, it is possible that the microorganism will in this condition manufacture and secrete surface active substances, or the cells of the microorganism may themselves assume a hydrophobic or surfactant-like character. Thus, the microorganism cells themselves, viable, dorment or possibly after death of the microorganism, will become the surface-active agent.

In the case where a sample, on analysis after removal from an oil reservoir, is determined as having numerous organisms (i.e. greater than about $10^3$ cells per milliliter), it is assumed that there are sufficient organisms in the reservoir to provide adequate surfactant production when practicing the invention. In that instance, those nutrients which limit microbial growth are supplied to the reservoir, whereafter the microorganisms are subjected to at least one cycle of nutrient limitation (by allowing the microorganism to deplete nutrients followed by supply of the depleted nutrients) whereby the surface active properties of the microorganisms are increased and oil recovery enhanced.

In practising the method of the invention where microorganisms are removed from an oil reservoir and subsequently returned to facilitate oil recovery, the removal of the microorganisms from the reservoir may be carried out in any conventional manner. Normally, a sample is retrieved from the reservoir via the well casing. The sample includes the formation water and oil in the reservoir together with the microorganisms. The retrieved sample is analysed utilizing methods known per se to persons skilled in the art, for example, atomic absorption spectrophotometry, to determine the nutrient(s) which appear to be limiting the growth of the organisms. Typically, such an analysis will show an absence of nitrogen, such as nitrates, and an absence of phosphates. The organisms are then grown up in a nutrient medium supplying the previously determined missing ingredients. Growth of the microorganisms in a range of nutrient media may be determined, and that medium which provides maximal bacterial growth selected for microorganism culture. During culture of the microorganisms, samples are removed and tested for surfactant properties. For example, a test may be made to determine the ability to reduce interfacial tension as effected by the organisms and a two-way comparison schedule established indicating the relationship between nutrient depletion and resultant surfactant properties of the organisms. Nutrient depletion may occur naturally as nutrients are consumed through microbial metabolism or may be effected by taking the organisms and placing them in a different medium, such as placing them in the medium originally withdrawn from the reservoir.

The microorganisms are generally subjected to several cycles of nutrient addition and nutrient depletion so as to maximise surfactant properties, which can be readily ascertained by measuring a reduction in interfacial tension caused by the microorganisms. Once the desired number of organisms have been produced which are sufficiently nutrient depleted to give optimal effects insofar as reduction in interfacial tension is concerned, the organisms are introduced into the oil reservoir. The microorganisms may be introduced through the well casing whereafter they spread from the point of introduction through the reservoir. The microorganisms permeate rock pores to act as surfactants to enable the trapped oil in the rock material to be readily flushed by outgoing water from a well.

It is important to note that microorganisms subjected to cycles of nutrient addition and depletion have a considerably smaller cell volume than those microorganisms which are subjected only to conditions of nutrient addition. A cell volume reduction of 70% is not uncommon. Additionally, such microorganisms may have a smaller cell volume than those microorganisms not removed from the well for processing. Microorganisms having a requisite small cell volume are able to penetrate rock pores, which when coupled with the surfactant properties of the microorganisms facilitates oil recovery.

Microorganisms which have surfactant properties and are able to survive the conditions in oil reservoirs, but which are not native to a particular reservoir in which they are proposed to be introduced, may be subject to cycles of nutrient addition and depletion to enhance their surface active properties in the manner described. Such microorganisms may then be added to an oil well to enhance oil recovery.

In accordance with the present invention it was surprisingly discovered that production water provided an adequate aqueous base in which the desired nutrients could be dissolved and/or microorganisms introduced prior to introduction into the reservoir. By "production water" is meant the aqueous phase of an oil-aqueous mixture emitted from a reservoir. Production water may also be referred to as co-produced water. The production water is buffered to be compatible to the ecology of the reservoir and frequently, carbonate or bicarbonate is used to prepare the buffering conditions. The choice of buffering compound is dependent on the ecological pH of the reservoir which can, in effect, range from pH 2-10. In a preferred method, the desired nutrient(s), optionally including carbon source and/or oxogenous microorganisms, are added to production water and injected into the reservoir under conditions and for a time sufficient in accordance with this invention. The emitted aqueous-oil mixture is collected and the phases separated. The aqueous phase is collected and analysed to determine the concentration of nutrient(s), carbon source and/or microorganisms originally contained therein. If necessary, the concentration(s) of these additives are adjusted accordingly and the buffering capacity is also adjusted if necessary before being injected back into the reservoir where the cycle is repeated.

In accordance with the present invention, it was further surprisingly discovered that the order in which the components were added to production water made a significant difference to the end result. It is advisable, therefore, to test individual reservoirs using sandpacks and production water to which the components listed in Example 3 ("Castenholtz" medium) have been added in varying orders.

By reservoir as used herein is meant any locus of deposit. Additionally, "oil recovery means" refers to standard oil recovery practices such as, but not limited to, use of water or gas to generate pressure.

Further details of methods for enhancing surface active properties of microorganisms and the recovery of oil using microorganisms are given in the following non-limiting examples.

EXAMPLE 1

This example demonstrates the dramatic decrease in interfacial tension (IT) which can be achieved by applying successive nutrient rich and nutrient limited growth cycles. Interfacial tension is measured in milliNewtons per meter.

A culture of *Acinetobacter calcoaceticus* with non-detectable surfactant production was inoculated into ½ strength NB (nutrient broth) with and without added paraffin. ½ strength NB had been shown in previous experiments to be optimal nutrient depletion for surfactant production. All cultures were incubated at 32° C.

overnight. The interfacial tension of the media was then measured against hexadecane using the drop formation method at 24, 48 and 96 hours incubation.

| | Media | Interfacial tension |
|---|---|---|
| Controls | ½ NB | 29.56 |
| | ½ NB + paraffin | 27.32 |
| 24 hours | ½ NB + culture | 30.16 |
| | ½ NB + paraffin + culture | 29.54 |
| 48 hours | ½ NB + culture | 26.94 |
| | ½ NB + paraffin + culture | 29.56 |
| 96 hours | ½ NB + culture | 29.71 |
| | ½ NB + paraffin + culture | 29.97 |

The culture from the ½ NB was then subcultured into fresh media and the test repeated.

| | Media | Interfacial tension |
|---|---|---|
| 24 hours | ½ NB + culture | 29.56 |
| | ½ NB + paraffin + culture | 27.32 |
| 48 hours | ½ NB + culture | 14.66 |
| | ½ NB + paraffin + culture | 14.04 |
| 96 hours | ½ NB + culture | 10.03 |
| | ½ NB + paraffin + culture | 8.60 |

The culture for the ½ NB+paraffin+culture was subcultured into fresh media and the test repeated.

| | Media | Interfacial tension |
|---|---|---|
| 24 hours | ½ NB + culture | 23.25 |
| | ½ NB + paraffin + culture | 20.91 |
| 48 hours | ½ NB + culture | 12.25 |
| | ½ NB + paraffin + culture | 9.45 |
| 96 hours | ½ NB + culture | 10.12 |
| | ½ NB + paraffin + culture | 6.42 |

This phenomena was reproduced using a number of mesophilic and thermophilic bacterial species including *Psedomonas aeruginosa*, *Pseudomonas fluorescens*, *Bacillus acidocaldarius*, *Thermus thermophilus* and *Thermus aquaticus*.

EXAMPLE 2

This example demonstrates the influence of hydrocarbons in this case paraffin on reduction in interfacial tension.

A culture of *Thermus aquaticus* (T.aq) was inoculated into the media of Castenholtz (Castenholtz, R. W. (1969), Bacteriol. Rev. 33, 476). One tube of each pair of cultures was covered with paraffin. The cultures were then incubated at 70° C. and the interfacial tension measured against hexadecane using the drop formation method.

| Culture | Incubation period (days) | Interfacial tension |
|---|---|---|
| T. aq | 2 | 43.96 |
| | 5 | 45.41 |
| | 7 | 44.97 |
| | 20 | 40.28 |
| T. aq + paraffin | 2 | 45.58 |
| | 5 | 42.34 |
| | 7 | 39.40 |
| | 20 | 19.87 |

Cultures with the lowest interfacial tensions were subcultured to fresh media and subjected to three further cycles of nutrient limitation and addition. The results for the fourth nutrient limitation cycle was as follows:

| Culture | Incubation period (days) | Interfacial tension |
|---|---|---|
| T. aq | 6 | 35.96 |
| | 11 | 33.94 |
| | 28 | 35.98 |
| | 32 | 32.23 |
| T. aq + paraffin | 6 | 33.34 |
| | 11 | 28.93 |
| | 25 | 8.25 |
| | 32 | 5.23 |

EXAMPLE 3

This example relates to tests effected on a sample of formation water and oil, retrieved from an oil well known as Alton in the Surat Basin of Southern Queensland, Australia.

Sampling Protocol for Reservoir Fluids

I. Samples for Microbiological Investigations

The major objectives during sampling were to collect a specimen representative of the reservoir fluids and to minimize mixing sample with air. Thus, specimens from Alton were collected from a sample point at the wellhead using the following protocol.

1. The sample was removed using 50 ml. plastic disposable syringes. The syringes were filled completely with sample so that air was not introduced during aspiration.

2. The needle on the sample syringe was inserted through the rubber septum of a sample bottle containing 0.1 ml. of 0.1% resazurin (redox indicator).

3. A second needle (B) was inserted just through the septum.

4. Reservoir fluids were injected into the sample bottle until they sprayed out through the needle B. When this occurred needle B was removed quickly. Subsequently the syringe and needle were removed.

5. Any samples which remained pink for more than 30 minutes after injection had 0.2 ml. aliquots of 10% $Na_2S.9H_2O$ added until the solution became colourless.

6. Samples were transported immediately to the laboratory for analysis.

II. Samples for Chemical Investigations

Samples for chemical analysis were collected according to standard methodologies, e.g. Collins A. G. (1975), Geochemistry of oilfield waters. Developments in science series No. 1, Elsevier Scientific Publishing Company, New York.

Initial Assessment of Samples

I. Microbiological

Microorganisms in samples containing oil and water were visualised using phase microscopy and stains e.g. Gram. A variety of microorganisms including a number of highly motile forms were observed. Species were grouped according to differences in morphology and staining characteristics. The predominant forms were two different bacilli, the first was relatively shorter and wider than the second. The shorter organism on occasions had swollen regions especially in the polar regions, the longer bacilli sometimes formed short chains or clumps. The third type of organism was a small Gram positive coccus. The number of organisms that could be visualized was proportional to the amount of oil in the sample examined.

II. Chemical

The chemical nature of the oil reservoir water was assessed using a number of analyses on water and oil/water samples. These analyses were conducted using standard techniques, e.g. Collins A. G. (1975), Geochemistry of oilfield waters, Developments in science series No. 1. Elsevier Scientific Publishing Company, New York; and American Petroleum Institute (1986). These techniques include atomic absorption spectrophotometry (AAS), flame photometery, and the use of selective ion electrodes. Recommended practice for analysis of oilfield waters. Representative of the results of analyses were the following:

| Analysis | mg./l | Analysis | mg./l |
|---|---|---|---|
| Sodium | 350 | Bicarbonate | 800 |
| Calcium | 3.5 | Carbonate | 50 |
| Potassium | 1.5 | Chloride | 115 |
| Magnesium | 1.0 | Sulphate | 4.5 |
| Zinc | 0.2 | Nitrate | 0.1 |
| Iron | Tr. | Phosphate | Tr. |
| Manganese | Tr. | pH | 8.4 |

Tr.—Trace

It was concluded that these results were fairly typical of those obtained from fresh artesian water in Lower Cretaceous-Jurassic aquifers in the area of the Surat Basin surrounding the Alton well.

Formulation of Bacterial Growth Media

Several carbon sources were tested for their ability to enhance microbial growth in the oil/water samples. These included varying concentrations of lactate, acetate, propionate, palmitate, benzoate, formate, hexadecane, hexadecene, $C_4C_6C_8$ mix and $H_2/CO_2$/Acetate. None of the carbon sources tested enhanced microbial growth.

From these results and the results of the chemical analyses of the Alton water sample it was deduced that nitrate and phosphate, potentially essential nutrients, virtually were depleted. A series of experiments was undertaken to determine whether serial addition and depletion of these nutrients would result in the production of surface active substances. Concurrent studies were undertaken to determine whether the addition of recognized bacterial growth stimulants such as peptone and yeast extract would enhance the production of surface active properties. Finally, the media exhibiting potentially desirable characteristics were tested for the recovery of Alton oil from porous material.

I. Initial Growth Media

Formulation of the initial growth media was based on the results of the chemical analyses and the previous observation that bacteria in the Alton reservoir required bicarbonate/carbonate buffering.

Materials and Methods 125 ml. Wheaton bottles were filled with 25 ml. of Alton oil and 75 ml. of the media under test. The bottles were then sealed and capped. A sterilized sample of Alton oil was inoculated into unsupplemented media as a control. Constituents of the basic media and the supplements added are shown in Table 1.

TABLE 1

| Chemical Constituents of Alton Reservoir Fluids | | |
|---|---|---|
| Constituent | | mg./l |
| Basic media: | Ammonium nitrate | 500 |
| | Nitrilotriacetic acid | 100 |
| | Calcium chloride (dihydrated) | 51.3 |
| | Magnesium carbonate (hydrated) | 40 |
| | Sodium nitrate | 689 |
| | Potassium nitrate | 103 |
| | di Sodium hydrogen phosphate | 280 |
| Trace elements: | Ferric chloride | 0.28 |
| | Manganese chloride | 2.6 |
| | Zinc chloride | 0.24 |
| | Boric acid | 0.5 |
| | Copper acetate | 0.02 |
| | Sodium molybdate | 0.025 |
| Other nutrients: | Nutrient | Final Concentration |
| | Sodium carbonate | 0.5% |
| | Yeast extract | 0.1% |
| | Peptone (beef derived) | 0.1% |

From these components, four culture media and a control were prepared. All culture media and the control contained basic media and sodium carbonate. The supplements added were shown in Table 2.

TABLE 2

| Initial Formulation of Growth Media | |
|---|---|
| Media # | Supplement |
| 1 | Trace elements, yeast extract, peptone |
| 2 | Yeast extract, peptone |
| 3 | Trace elements, peptone |
| 4 | Peptone |
| Control | Nil |

All bottles were chemically reduced using 0.5 ml. of 0.5% Sodium sulphide solution and the anaerobic nature of the bottles verified by the presence of reduced 0.1% resazurin. Incubation temperature was set at about 72° C. which approximates the temperature of Alton reservoir.

Samples were monitored weekly for growth and interfacial tension. Growth was measured semi-quantitatively using microscopy. Interfacial tension was measured against hexadecane using the drop formation technique (Harkins, M. E. and Brown, B., (1919) J. Amer. Chem. Soc. 41, p. 499). This technique involves expelling a sample from a syringe into a solution of hexadecane. The volume of liquid required for drop formation is ascertained, and interfacial tension measured using standard formulae.

Results

There was no significant difference in semi-quantitative growth between media.

TABLE 3

| | Formulation of Growth Media | | | | |
|---|---|---|---|---|---|
| Culture | Initial | Week 1 | Week 2 | Week 3 | Week 4 |
| Media 1 | 22.9 | 20.1 | 22.4 | 22.4 | 22.5 |
| Media 2 | 24.5 | 20.3 | 23.8 | 21.5 | 21.8 |
| Media 3 | 24.3 | 19.3 | 24.8 | 22.5 | 21.5 |
| Media 4 | 24.3 | 19.4 | 24.1 | 21.5 | 19.1 |
| Media (no oil) | 29.3 | | | | |

This pattern is consistent with a nutrient limited state after initial inoculation (lag phase, Week 1) followed by an active growth period (exponential phase, Week 2). A further nutrient limited state occurs on subsequent proliferation (stationary phase, Weeks 3 and 4). Media 1 and 2 were very rich media. Hence, nutrient depletion was only partial at Week 4 in these media.

Conclusion

1. The addition of yeast extract was detrimental to interfacial tension reduction in this time frame.
2. The addition of the trace element solution did not enhance microbial growth nor interfacial tension reduction.

As a result of these experiments, Media #4 was chosen for oil recovery experiments.

Oil Recovery from Sandpacks

The recover of residual oil from sandpacks was investigated as follows:

| Materials | |
|---|---|
| Sand | May & Baker, Batch MX 6210, acid-washed, mediumfine, Sterilized for 10 hrs at 170° C. Grain size: not more than 35% passes through a 300 micron sieve, and not more than 20% passes through a 150 micron sieve. |
| Sand/Oil | 5 ml. of oil per 34 g of sand. |
| Media | Media #4 (as above). |
| Test tubes | Pyrex 9827. |
| Seals | Subaseals No. 33 + cable ties. |

Methods

1. Sand/oil mixture. Sand and oil were mixed in one batch using the ratio of 5 ml. of oil to 34 g. of sand. This sand/oil ratio had previously been determined by waterflooding sand until no further residual oil was recovered. Tubes containing the sand/oil mixture were packed using an ultrasonic bath for 10 minutes.

2. The equivalent by weight of 5 ml. of oil and 34 g. of sand/oil mixture was added to each tube. In addition 22 ml. of Media #4 with and without carbonate was added to each tube. The tubes were capped and the caps secured with a tie.

3. All tubes were incubated at 72° C. in a hot air oven.

4. The amount of oil recovered from the sandpacks was determined by the weight difference of the tube after any oil on the surface of the water was removed by syringe.

5. At the completion of the experiment the amount of oil remaining in the sand was verified by extraction with an organic solvent comprising 87% chloroform and 13% methanol in a soxhlet apparatus.

Results

TABLE 4

Recovery of Oil from Sandpacks

| Mixture | Week 3 | Week 6 | Week 9 | Total | % Recovery |
|---|---|---|---|---|---|
| Media | 0.775 | 0.559 | 0.231 | 1.566 | 36.4 |
| SDS | 1.541 | 0.029 | 0.011 | 1.579 | 36.7 |

Discussion

As microbiological enhancement of oil recovery using Media #4 was equivalent to that achieved using a commercial surfactant this medium was adopted for final testing.

High Pressure and High Temperature Experiments

The final phase of preliminary experimentation was to analyse oil recovery under simulated Alton reservoir conditions.

Materials and Methods

The recovery of residual oil under conditions prevailing in the Alton reservoir was tested using an apparatus especially designed for that purpose. It comprises a metal tube inside a water jacket. The tube was packed with porous material and sample then sealed. Temperature is maintained by a circulating system in which $H_2O$ is pumped through a silicon oil bath and around the water jacket of the core. Temperature is regulated at 73° C. by a thermostat. Initial pressure of approximately 5000 kPa, is generated by an Haskell hydraulic pump.

1. Oil and sand as described above were mixed until there was an excess of oil. This mixture was drained and packed into the stainless steel column. The stainless steel column was then transferred into the core of the high pressure/high temperature cell. The column was then placed under pressure and brought up to temperature.

2. Once the packed sand/oil column had equilibrated, the column was flooded at regular intervals with water. This process was repeated until no further oil recovered from the column.

3. Media #4 which had been adjusted to reflect the chemical equilibria pertaining in the Alton reservoir was introduced into the column until it displaced the water. The column was then sealed and maintained at the relevant temperature and pressure.

4. Samples were removed from the column and oil release monitored. At this time the nutritional status of the bacteria is tested and nutrient flooding repeated or withheld according to the result 5. If residual oil was not displaced during this process, the column was inoculated with an enriched culture of Alton reservoir bacteria which have been nutritionally deprived in the laboratory. The column is released and steps 4 and 5 repeated until no further residual oil is retrieved.

Media

The media utilised in this test was comprised of production water from the Alton reservoir supplemented with the following chemicals.

| | Chemical | g./1000l |
|---|---|---|
| Sol"A | Nitrilotriacetic acid | 100 |
| | $Na_2HPO_4$ | 280 |
| | $NH_4NO_3$ | 1087 |
| | $CaCl_2.2H_2O$ | 51 |
| | $MgCO_3$ | 40 |
| | $NaNO_3$ | 69 |
| | $KNO_3$ | 103 |
| | Peptone | 1000 |
| Sol"B | $NaHCO_3$ | 3000 |

Solution A and Solution B are mixed together, then adjusted to pH 8.4 using either concentrated hydrochloric acid or magnesium carbonate. The peptone is then added. This media is filter sterilized and preheated to 73° C. prior to flooding the column.

Results:

The sand/oil mixture was comprised of 751 g. of sand and 123 ml. of oil. During water flooding 98 ml. of oil was recovered. A nutrient flood was introduced after 2 weeks.

TABLE 5

Recovery of Oil from Reservoir Simulator

|  | Week 1 | Week 2 | Week 3 |
|---|---|---|---|
| IT (Interfacial tension) | 18.5 | 12.8 | 17.1 |
| pH | 9.32 | 9.45 | 8.86 |
| Oil recovered (ml) | 1.5 | 3.4 | 1.1 |
| Total oil remaining in column: |  | 123 − 98 = 25 ml. |  |
| Oil recovered: |  |  | 6 ml. |
| % additional residual oil recovered: |  |  | 24% |

EXAMPLE 4a

Figure 1:
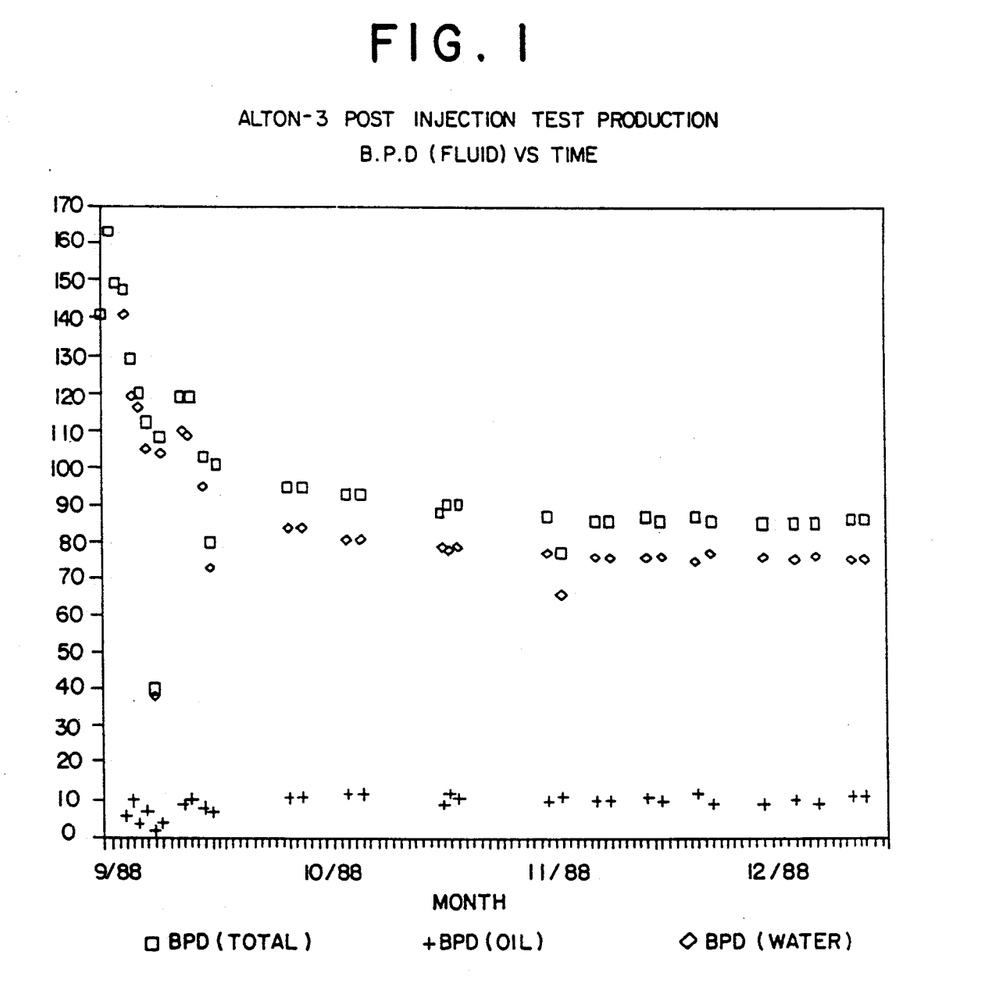
FIG. 1 is a graphical representation of production of oil in barrels per day (BPD(+)) at Alton-3 well after injection of production water without nutrients.

The results of control field test (i.e. production water without nutrients) are presented below. The field test was conducted at the Alton-3 well in Queensland, Australia. The results are presented graphically (FIG. 1) and clearly show that after shut out in September, 1988, production water alone did not result in enhanced oil recovery.

EXAMPLE 4b

Figure 2:
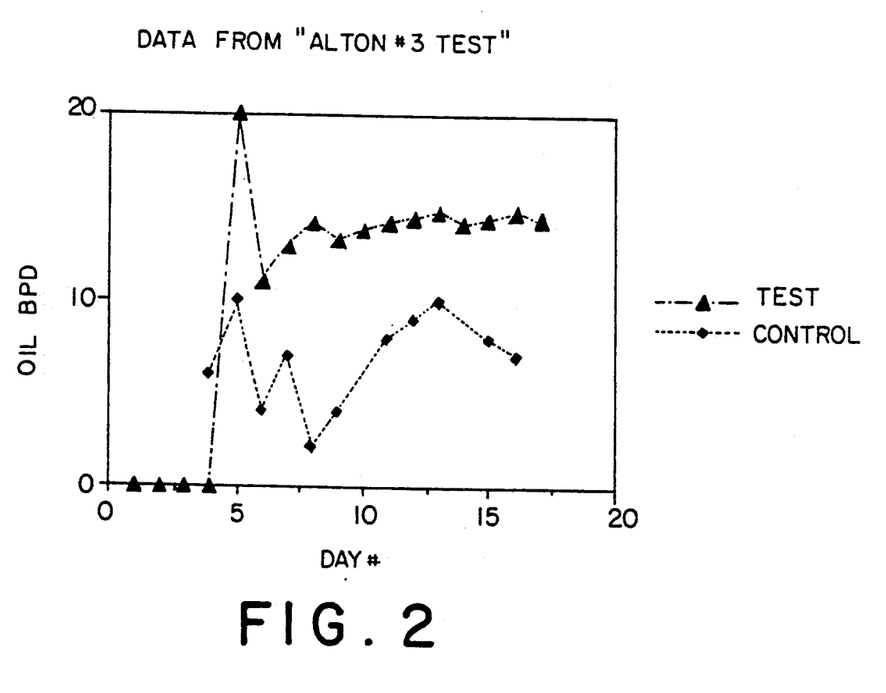
FIG. 2 is a graphical representation of production of oil in barrels per day (BPD(+)) at Alton-3 well after injection of production water with nutrients.

A field test was carried out as outlined below, and involved production water plus nutrients. Results are shown in FIG. 2.

In general, buffered production water containing the nutrients given in Example 3 was added to the well and the well "shut in" i.e. closed, for a period of about three weeks. At the end of that time, the well was brought back into production and assayed for oil production.

1. INJECTION PROGRAM

| Producing Beam Pump | |
|---|---|
| Production Casing: | 7" O.D. (complete string) |
| From bottom to top: | 2 jts 26# J-55 |
|  | 37 jts 29# N-80 |
|  | 43 jts 23# S-95 |
|  | 87 jts 26# J-55 |
| Production Tubing: | 2⅞", 6.5 ppf, EUE conn J-55 grade |
| Slotted Liner: | 6032 ft to 6063 ft RKB |
|  | 6073 ft to 6104 ft RKB |
| Plug Back Total Depth: | 6109 ft RKB |

(b) Programme 1.0— Move ring onto location. Rig up. Install kill line on annulus side. Kill well utilising bore water.
2.0— Unseat pump. Pull sucker rod string.
3.0— Nipple down Xmas tree. Install BOP's c/w 2-⅞" pipe rams.
4.0— Unseat tubing anchor catcher and RIH with 2-⅞" string tag PBTD to confirm presence or absence of fill on bottom.

Note: Completion BHA from last recompletion is as follows: (Bottom to top)

|  | LENGTH (FT) | TOP SET AT (FT RKB) |
|---|---|---|
| 3" O.D. Gas Anchor | 25.6' | 5972.03 |
| Pump Seat Nipple | 1.56 | 5970.47 |
| 2⅞" × 7" TAC | 2.56 | 5967.91 |
| 190 jts, 2-7/7" Tubing | 5953.31 | 14.60 |

Printout cancelled by operator.

Notes (i) fluid injection at 0.5 bbl/min at 2200 PSIG.

(ii) a total of 15,000 liters (94.3 bbls) of nutrient solution was prepared. Allowing for 7% tank bottoms, this gave a pumpable volume of about 86 bbls; 25 bbls was injected while the nutrient mix was optimized, the remainder was injected over approximately 3 hours after 9–12 hours exposure to the atmosphere and subsequent pH rectification.

(iii) all fluid injected into formation was filtered through 28 and 10 micron filters.

8.0— Unseat packer and POOH.
9.0— Recomplete well as per previous completion string.
10.0— Nipple down BOP's. N/U Xmas tree.
11.0— Rig down and move off location.
12.0— Re-run sucker rod string. Space out and land pump in PSN. Put well on pump.

2. RESULTS

Shut in was on Jan. 26, 1989 and shut out was on Feb. 17, 1989.

The following results were obtained.

|  | Date | | | | | | | | | | | | |
|---|---|---|---|---|---|---|---|---|---|---|---|---|---|
|  | 17/2 | 18/2 | 19/2 | 20/2 | 21/2 | 22/2 | 23/2 | 24/2 | 25/2 | 26/2 | 27/2 | 28/2 | 1/3 |
| Cross BPD | 156 | 148 | 156 | 143 | 143 | 129 | 128 | 129 | 122 | 120 | 120 | 117 | 116 |
| Oil | — | — | — | — | 20 | 11 | 13 | 14.2 | 13.3 | 13.8 | 14.2 | 14.6 | 14.9 |

The results clearly demonstrate an enhanced recovery of oil from the reservoir.

The described arrangement has been advanced merely by way of explanation and many modifications may be made thereto without departing from the spirit and scope of the invention which includes every novel feature and combination of novel features herein disclosed.

I claim:

1. A method for recovering oil from a reservoir having a population of endogenous microorganisms comprising adding to said reservoir nutrients comprising a non-glucose-containing carbon source and at least one other non-glucose-containing nutrient, said nutrient being growth effective for the endogenous microorganisms, maintaining said reservoir for a time and under conditions sufficient for the substantial depletion of at least one of the added nutrients, wherein the added nutrients and depletion of at least one of the added nutrients result in microorganisms having reduced cell volume, and thereafter subjecting said reservoir to oil recovery means.

2. The method according to claim 1 wherein said other non-glucose-containing nutrient comprises at least one of the following elements: C, H, O, P, N, S, Mg, Fe or Ca.

3. The method according to claim 2 wherein said other non-glucose-containing nutrient is an inorganic molecule.

4. The method according to claim 1 wherein the non-glucose-containing carbon source is peptone or protein and/or digests or extracts or sources thereof.

5. The method according to claim 1 wherein said non-glucose-containing carbon source is eukaryotic and/or prokaryotic cells and/or cell extracts thereof.

6. The method according to claim 1 wherein said endogenous microorganisms are indigenous microorganisms.

7. The method according to claim 1 wherein said reduction in cell volume is at least 70%.

8. The method according to claim 1 wherein said endogenous microorganisms develop increased surface active properties as measured by methods known per se in the art.

9. A method according to claim 1 wherein an increase in microbial surface active properties is measured by the hexane drop formation method or by hydrophobic interaction chromatography.

10. The method according to claim 1 wherein said oil recovery means includes increasing the reservoir pressure to eject oil therefrom.

11. The method according to claim 10 wherein the increase in reservoir pressure is effected by injecting water or gas into or adjacent to the reservoir.

12. The method according to claim 1 further comprising the addition of exogenous microorganisms to said reservoir.

13. The method according to claim 1 wherein nutrients and/or microorganisms are introduced into said reservoir in water or oil.

14. The method according to claim 13 wherein said water is repeatedly cycled into a reservoir wherein one cycle comprises adding to said water the required effective amount of nutrients and/or microorganisms and then introducing same into a reservoir for a time and under conditions sufficient to effect oil recovery, recovering said water from said recovered oil and optionally determining levels of said nutrients and/or microorganisms therein, replenishing levels thereof if required and re-introducing said water containing replenished levels of said nutrients and/or microorganisms into said reservoir.

15. The method of claim 1 which is carried out under anaerobic conditions.

16. A method according to claim 1 wherein said non-glucose-containing carbon source is anaerobically degradable.

17. A method for recovering oil from a reservoir having a population of endogenous microorganisms comprising adding to said reservoir nutrients comprising a non-glucose-containing carbon source and at least one other non-glucose-containing nutrient, said nutrient being growth effective for the endogenous microorganisms, maintaining said reservoir for a time and under conditions sufficient for the substantial depletion of at least one of the added nutrients, wherein the added nutrients and depletion of at least one of the added nutrients result in microorganism having increased surface active properties, and thereafter subjecting said reservoir to oil recovery means.

18. The method according to claim 17 wherein said microorganisms undergo a decrease in mean cell volume.

19. A method for recovering oil from a reservoir having a population of endogenous microorganisms comprising adding to said reservoir nutrients comprising a non-glucose-containing carbon source and at least one other non-glucose-containing nutrient, said nutrient being growth effective for the endogenous microorganisms, maintaining said reservoir for a time and under conditions sufficient for the substantial depletion of at least one of the added nutrients, wherein the added nutrients and depletion of at least one of the added nutrients result in microorganisms having reduced cell volume and/or increased surface active properties, and thereafter subjecting said reservoir to oil recovery means.

20. A method of oil recovery from an oil reservoir which comprises:
   a) providing microorganisms from the reservoir or other source which may be adapted to oil reservoir conditions;
   b) placing the microorganisms in a nutrient medium comprising a non-glucose-containing carbon source and at least one other non-glucose-containing nutrient, said carbon source and other nutrient being growth effective for the microorganisms;
   c) maintaining the microorganisms for a time and under conditions sufficient for the substantial depletion of at least one of the nutrients, wherein the nutrient medium and depletion of at least one of the nutrients results in microorganisms having a reduced cell volume;
   d) introducing the microorganisms to the reservoir; and
   e) recovering oil from the reservoir.

21. The method according to claim 20 wherein said other non-glucose-containing nutrient comprises at least one of the following elements: C, H, O, P, N, S, Mg, Fe or Ca.

22. The method according to claim 21 wherein said other non-glucose-containing nutrient is an inorganic molecule.

23. The method according to claim 20 wherein said non-glucose-containing carbon source is peptone or protein and/or digests or extracts or sources thereof.

24. The method according to claim 20 wherein the non-glucose-containing carbon source is eukaryotic and/or prokaryotic cells and/or cell extracts thereof.

25. A method of oil recovery from an oil reservoir which comprises:
   a) providing microorganisms from the reservoir or other source which may be adapted to oil reservoir conditions;
   b) placing the microorganisms in a nutrient medium comprising a non-glucose-containing carbon source and at least one other non-glucose-containing nutrient, said carbon source and other nutrient being growth effective for the microorganisms;
   c) maintaining the microorganisms for a time and under conditions sufficient for the substantial depletion of at least of the nutrients, wherein the nutrient medium and depletion of at least one of the nutrients results in microorganisms having increased surface active properties;
   d) introducing the microorganisms to the reservoir; and
   e) recovering oil from the reservoir.

26. A method of oil recovery from an oil reservoir which comprises:
  a) providing microorganisms from the reservoir or other source which may be adapted to oil reservoir conditions;
  b) placing the microorganisms in a nutrient medium comprising a non-glucose-containing carbon source and at least one other non-glucose-containing nutrient, said carbon source and other nutrient being growth effective for the microorganisms;
  c) maintaining the microorganisms for a time and under conditions sufficient for the substantial depletion of at least of the nutrients, wherein the nutrient medium and depletion of at least one of the nutrients results in microorganisms having a reduced cell volume and/or increased surface active properties;
  d) introducing the microorganisms to the reservoir; and
  e) recovering oil from the reservoir.

27. A method for recovering oil from a reservoir comprising the steps of:
  a) isolating endogenous microorganisms from said reservoir;
  b) ascertaining the limiting nutrient(s) for growth of said microorganisms;
  c) growing said microorganisms under conditions sufficient to increase their population level, and thereafter subjecting said microorganisms to nutrient limiting conditions sufficient to produce a reduction in mean cell volume to a level compatible with injection into said reservoir;
  d) supplying an amount of said nutrient(s) together with said microorganisms to said reservoir for a time and under conditions sufficient to effect an increasing population of endogenous microorganisms in said reservoir, said nutrients comprising a non-glucose-containing carbon source and at least one other non-glucose-containing nutrient, said nutrients being growth effective for the endogenous microorganisms;
  e) maintaining said reservoir for a time and under conditions sufficient for the substantial depletion of at least one of the nutrients, the addition of a non-glucose-containing carbon source, at least one other non-glucose-containing nutrient, and the depletion of at least one of the nutrients resulting in a microorganism having increased surface active properties;
  f) subjecting said reservoir to oil recovery means.

28. A method for recovering oil from a reservoir comprising the steps of:
  a) isolating endogenous microorganisms from said reservoir;
  b) ascertaining the limiting nutrient(s) for growth of said microorganisms;
  c) growing said microorganisms under conditions sufficient to increase their population level, and thereafter subjecting said microorganisms to nutrient limiting conditions sufficient to produce a reduction in mean cell volume to a level compatible with injection into said reservoir;
  d) supplying an amount of said nutrient(s) together with said microorganisms to said reservoir for a time and under conditions sufficient to effect an increasing population of endogenous microorganisms in said reservoir, said nutrients comprising a non-glucose-containing carbon source and at least one other non-glucose-containing nutrient, said nutrients being growth effective for the endogenous microorganisms;
  e) maintaining said reservoir for a time and under conditions sufficient for the substantial depletion of at least one of the nutrients, the addition of a non-glucose-containing carbon source, at least one other non-glucose-containing nutrient, and the depletion of at least one of the nutrients resulting in a microorganism having increased surface active properties;
  f) subjecting said reservoir to oil recovery means.

29. A method for recovering oil from a reservoir comprising the steps of:
  a) isolating endogenous microorganisms from said reservoir;
  b) ascertaining the limiting nutrient(s) for growth of said microorganisms;
  c) growing said microorganisms under conditions sufficient to increase their population level, and thereafter subjecting said microorganisms to nutrient limiting conditions sufficient to produce a reduction in mean cell volume to a level compatible with injection into said reservoir;
  d) supplying an amount of said nutrient(s) together with said microorganisms to said reservoir for a time and under conditions sufficient to effect an increasing population of endogenous microorganisms in said reservoir, said nutrients comprising a non-glucose-containing carbon source and at least one other non-glucose-containing nutrient, said nutrients being growth effective for the endogenous microorganisms;
  e) maintaining said reservoir for a time and under conditions sufficient for the substantial depletion of at least one of the nutrients, the addition of a non-glucose-containing carbon source, at least one other non-glucose-containing nutrient, and the depletion of at least one of the nutrients resulting in a microorganism having a reduced cell volume and/or increased surface active properties.
  f) subjecting said reservoir to oil recovery means.

30. A method for recovering oil from a reservoir comprising first increasing the population of endogenous microoganisms in said reservoir by the addition of a growth effective amount of one or more nutrients comprising an anaerobically-degradable non-glucose-containing carbon source and at least one or more inorganic molecules, and then maintaining said reservoir for a time and under conditions sufficient for the substantial depletion of at least one of the added nutrients, the nutrients and the depletion of at least one of said nutrients resulting in microorganisms having reduced cell volume, said depletion being measured over time and/or by the increase in a population of endogenous microorganisms having surface active properties and thereafter subjecting said reservoir to oil recovery means.

31. A method for recovering oil from a reservoir comprising first increasing the population of endogenous microorganisms in said reservoir by the addition of a growth effective amount of one or more nutrients comprising an anaerobically-degradable non-glucose-containing carbon source and at least one or more inorganic molecules, and then maintaining said reservoir for a time and under conditions sufficient for the substantial depletion of at least one of the added nutrients, the nutrients and the depletion of at least one of said nutrients resulting in microorganisms having increased surface active properties, said depletion being measured over time and/or by the increase in a population of endogenous microorganisms having surface active properties and thereafter subjecting said reservoir to oil recovery means.

32. A method for recovering oil from a reservoir comprising first increasing the population of endogenous microoganisms in said reservoir by the addition of a growth effective amount of one or more nutrients comprising an anaerobically-degradable non-glucose-containing carbon source and at least one or more inorganic molecules, and then maintaining said reservoir for a time and under conditions sufficient for the substantial depletion of at least one of the added nutrients, the nutrients and the depletion of at least one of said nutrients resulting in microorganisms having reduced cell volume and/or increased surface active properties, said depletion being measured over time and/or by the increase in a population of endogenous microorganisms having surface active properties and thereafter subjecting said reservoir to oil recovery means.

* * * * *